(12) United States Patent
Heo et al.

(10) Patent No.: US 8,128,157 B2
(45) Date of Patent: Mar. 6, 2012

(54) CENTER PILLAR ASSEMBLY OF 3-DOOR VEHICLE

(75) Inventors: Chul Hee Heo, Anyang-si (KR); Hee Dae Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/871,504

(22) Filed: Aug. 30, 2010

(65) Prior Publication Data

US 2011/0266836 A1 Nov. 3, 2011

(30) Foreign Application Priority Data

Apr. 29, 2010 (KR) .................. 10-2010-0040327

(51) Int. Cl.
*B60N 99/00* (2006.01)
(52) U.S. Cl. .......... 296/193.06; 296/187.01; 296/187.12
(58) Field of Classification Search ............. 296/187.01, 296/187.12, 193.06
See application file for complete search history.

(56) References Cited

U.S. PATENT DOCUMENTS

| | | | | |
|---|---|---|---|---|
| 5,586,799 | A * | 12/1996 | Kanemitsu et al. ...... | 296/203.02 |
| 7,407,220 | B2 * | 8/2008 | Kanagawa et al. ...... | 296/187.09 |
| 7,407,222 | B2 * | 8/2008 | Anderson et al. ........ | 296/193.06 |
| 7,481,486 | B2 * | 1/2009 | Rashidy et al. .......... | 296/193.02 |
| 2010/0295336 | A1 * | 11/2010 | Itakura ..................... | 296/193.06 |
| 2011/0127800 | A1 * | 6/2011 | Ishimaru et al. ......... | 296/193.06 |
| 2011/0156446 | A1 * | 6/2011 | Iwase et al. .............. | 296/193.06 |
| 2011/0163571 | A1 * | 7/2011 | Furusako et al. ........ | 296/193.06 |

FOREIGN PATENT DOCUMENTS

| | | |
|---|---|---|
| JP | 7-149258 A | 6/1995 |
| JP | 9-249154 A | 9/1997 |
| JP | 2005-313685 A | 11/2005 |
| JP | 2007-55494 A | 3/2007 |
| JP | 2009-248729 A | 10/2009 |
| JP | 2009-292367 A | 12/2009 |
| KR | 1998-042576 U | 9/1998 |

* cited by examiner

*Primary Examiner* — Lori Lyjak
(74) *Attorney, Agent, or Firm* — Morgan, Lewis & Bockius LLP

(57) ABSTRACT

A center pillar assembly of a 3-door vehicle may include a side outer panel, one end portion of which is formed with a quarter glass flange, an outer reinforcement member for a center pillar for reinforcing the side outer panel, in which its upper portion and its lower portion are formed in a cross section of '⌐⌐'-shape, a gusset for connecting the upper portion of the outer reinforcement member with the quarter glass flange, wherein one lateral side portion of the outer reinforcement member is connected to the gusset, and a side inner panel being arranged in an inner part of the side outer panel, one lateral side portion thereof being connected to the one lateral side portion of the outer reinforcement member and the gusset.

8 Claims, 6 Drawing Sheets

CENTER PILLAR ASSEMBLY OF 3-DOOR VEHICLE

CROSS-REFERENCE TO RELATED APPLICATION

The present application claims priority to Korean Patent Application Number 10-2010-0040327, filed on Apr. 29, 2010, the entire contents of which are incorporated herein for all purposes by this reference.

BACKGROUND OF THE INVENTION

1. Field of the Invention

The present invention relates to a center pillar assembly of a 3-door vehicle. More particularly, the present invention relates to a center pillar assembly of a 3-door vehicle, in which it may not only reduce its manufacturing cost, but also it may increase its strength.

2. Description of Related Art

In general, an outer reinforcement member for a center pillar is the most important reinforcement member for protecting the deformation of the vehicle when the broad-collision of the vehicle occurs. However, in case of a 3-door vehicle, it equips a quarter glass instead of a rear door, which is different from a 5-door vehicle. Accordingly, an upper portion of the outer reinforcement member for the center pillar is formed in a cross section of '⌐'-shape to be welded to a quarter glass flange of a side outer panel, in which it is not formed in a cross section of '⊓'-shape.

Now, the center pillar assembly of the 3-door vehicle will be explained in more detail with reference to FIGS. 1 and 2.

As shown in FIGS. 1 and 2, the center pillar assembly of the 3-door vehicle is composed of a side outer panel 110, an outer reinforcement member 120 for the center pillar and a side inner panel 140, wherein a quarter glass flange 115 is formed in the side outer panel 110. Here, the outer reinforcement member 120 for the center pillar includes an upper portion A' and a lower portion B', and is welded to the inner part of the side outer panel 110. Also, the side inner panel 140 is welded to the inner part of the outer reinforcement member 120 for the center pillar so as to face each other.

The outer reinforcement member 120 for the center pillar plays a role in reinforcing the side of the vehicle, wherein it includes the upper portion A' which is welded to the quarter glass flange 115, and the lower portion B' which is extended along the bottom of the upper portion A'.

At this point, the lower portion B' of the outer reinforcement member 120 for the center pillar is formed in the section of '⊓'-shape to be profited from the broad-collision of the vehicle, but the upper portion A' is formed in the section of '⌐'-shape to be easily deformed by the broad-collision of the vehicle. Accordingly, because the strength of a 'Neck' part N is weak in which the 'Neck' part N is a part that two sections of the upper portion A' and the lower portion B' of the outer reinforcement member 120 for the center pillar are faced with each other, an additional reinforcement member 130 for reinforcing the 'Neck' part N is welded to the outer reinforcement member 120 for the center pillar.

On the other hand, recently, although an ultra-high strength steel over 980 MPa is generally used as a material of the outer reinforcement member 120 for the center pillar in order to accomplish for the light weight of the material, its section must be hardly changed when it uses the ultra-high strength steel. But, in case of the outer reinforcement member 120 for the center pillar according to the prior art, the sections of its upper portion A' and its lower portion B' must be steeply changed from the '⌐'-shape to the '⊓'-shape, and accordingly, it was difficult to press-mold the ultra-high strength steel.

Accordingly, as the material of the outer reinforcement member 120 for the center pillar, it used a moldable 440 MPa-class material. Also, the outer reinforcement member 120 for the center pillar was used to be molded using a hot stamping method with little restriction for formability although the ultra-high strength steel was used.

As described above, according to the center pillar assembly of the conventional 3-door vehicle, the section of the upper portion A' of the outer reinforcement member 120 for the center pillar was formed in the '⌐'-shape which is weak in the collision performance, and accordingly, there was a problem that the manufacturing cost is increased since the additional reinforcement member 130 for reinforcing the outer reinforcement member 120 for the center pillar must be used.

Besides, in case where the ultra-high strength steel is molded as a material of the outer reinforcement member 120 for the center pillar, it must use the hot stamping method with little restriction for formability, and accordingly, there was a problem that the manufacturing cost is increased. Also, in case where it is molded as the moldable 440 MPa-class material, there was a problem that its strength becomes weaken.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a center pillar assembly of a 3-door vehicle for reducing its manufacturing cost as well as increasing its strength.

In an aspect of the present invention, the center pillar assembly of a 3-door vehicle, may include a side outer panel, one end portion of which is formed with a quarter glass flange, an outer reinforcement member for a center pillar for reinforcing the side outer panel, in which its upper portion and its lower portion are formed in a cross section of '⊓'-shape, a gusset for connecting the upper portion of the outer reinforcement member with the quarter glass flange, wherein one lateral side portion of the outer reinforcement member is connected to the gusset, and a side inner panel being arranged in an inner part of the side outer panel, one lateral side portion thereof being connected to the one lateral side portion of the outer reinforcement member and the gusset.

The gusset may include a gusset body formed along a length direction of the quarter glass flange, and connected to the one lateral side portion of the outer reinforcement member for the center pillar, and a first gusset flange being bent outwards from one side of the gusset body, and being connected to the quarter glass flange.

The gusset body and the first gusset may be formed in a cross section '⌐' shape.

The gusset may further include a second gusset flange being bent outwards from another side of the gusset body, and being connected to the one lateral side portion of the outer reinforcement member and the one lateral side portion of the side inner panel.

The first gusset flange, the gusset body and the second gusset of the gusset may be formed in a cross section '⊏' shape.

The gusset may be manufactured to be longer than a length of the quarter glass flange.

The outer reinforcement member may be molded by cold press-molding using steel over 980 MPa.

The gusset may be disposed along a length direction of the outer reinforcement member between the upper portion of the outer reinforcement member and the quarter glass flange and formed in a cross section '⊏' shape.

As described above, according to the present invention, both of the upper and lower portions of the outer reinforcement member for a center pillar are formed in the section of '⊐⊏'-shape, and thus, it may increase its strength to be profited from the broad-collision, and may reduce the manufacturing cost because an additional reinforcement member needs not to add into the conventional 'neck' part.

Furthermore, according to the present invention, because the sections of the upper portion and lower portion of the outer reinforcement member for a center pillar are hardly changed, it is possible to accomplish the light weight of the vehicle owing to using the ultra-high strength steel with much restriction for formability. In addition, because it is possible to perform a cold press-molding, the manufacturing cost may be reduced in comparison with the prior art in which the hot stamping method must be used.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
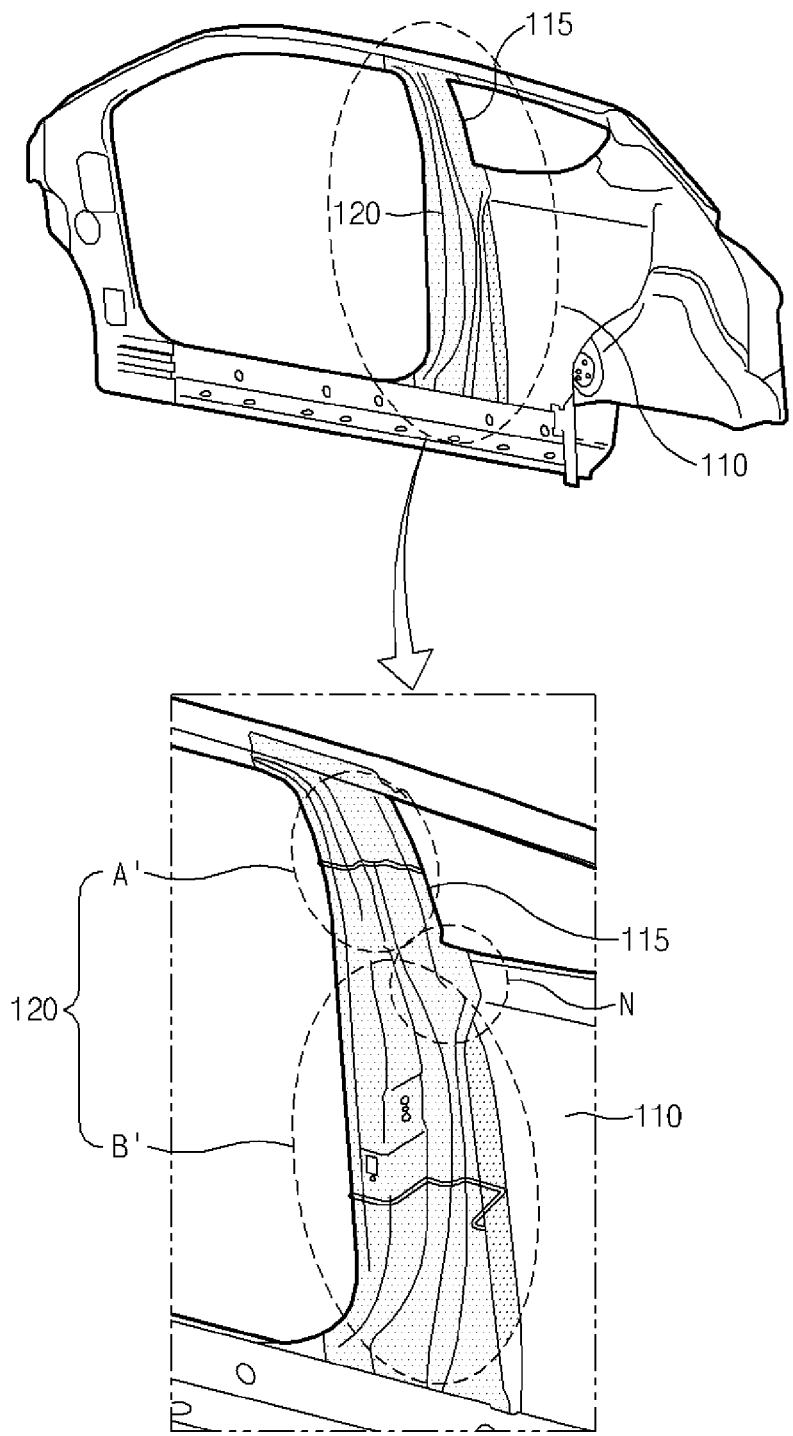
FIG. 1 is a perspective view for illustrating a state which a side inner panel is removed in a center pillar assembly of a 3-door vehicle according to the prior art.
Figure 2:
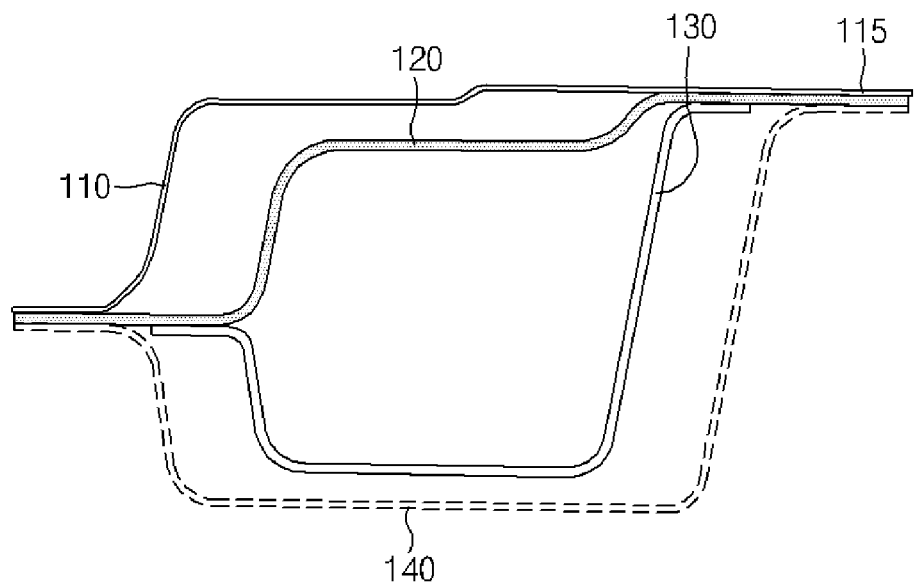
FIG. 2 is a section view for a center pillar assembly of a 3-door vehicle according to the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Now, an embodiment of the present invention will be explained in more detail with reference to the attached drawings.

Figure 3:
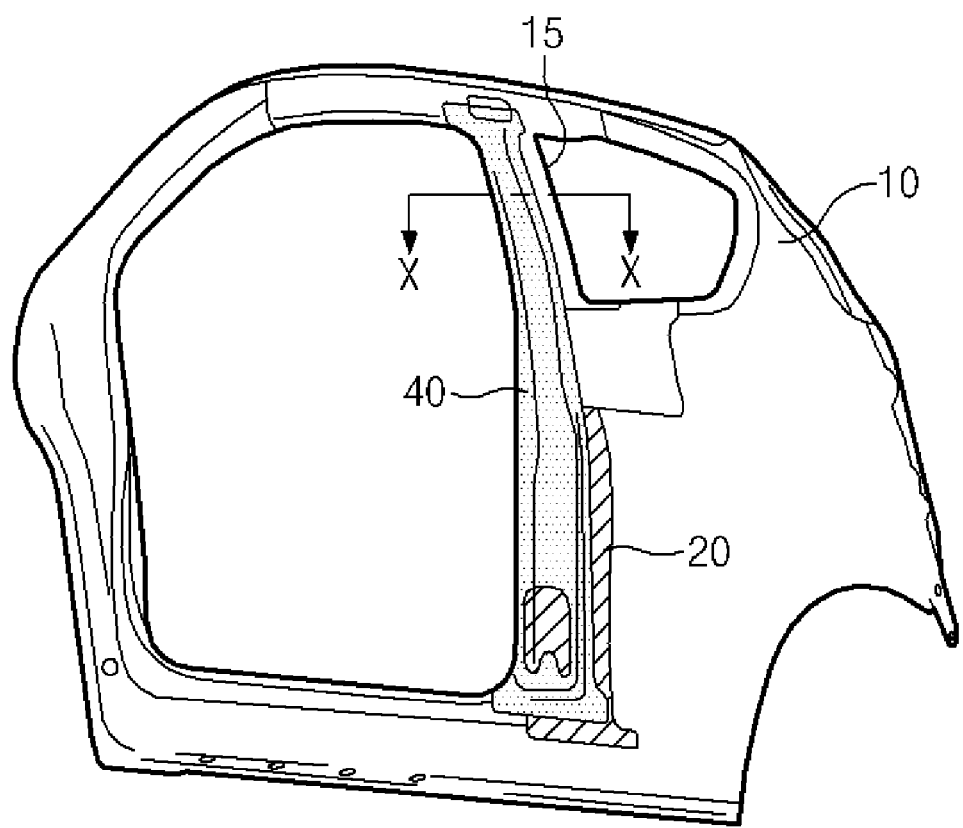
FIG. 3 is a perspective view for illustrating an exemplary center pillar assembly of a 3-door vehicle according to the present invention.
Figure 4:
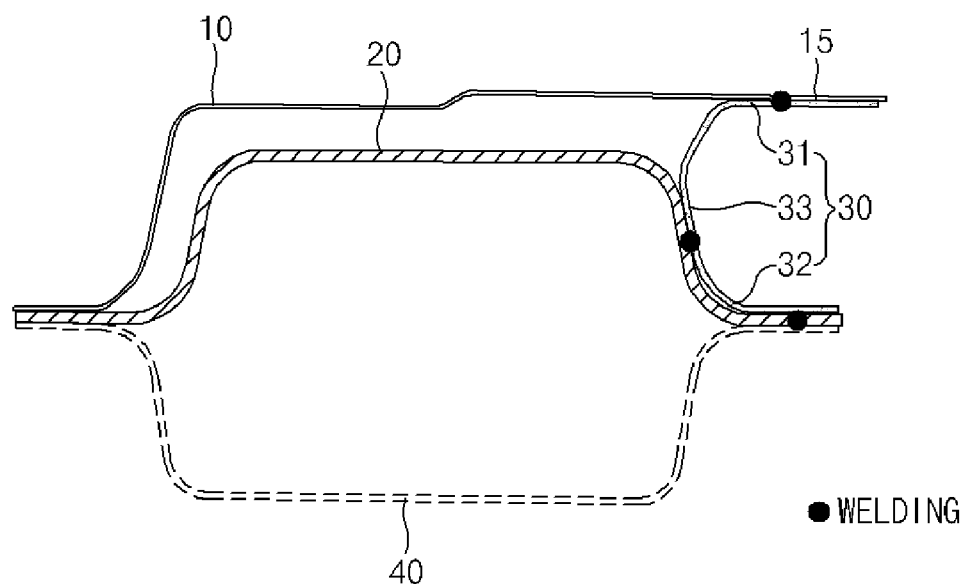
FIG. 4 is a section view being cut along X-X lines of FIG. 3.
Figure 5:
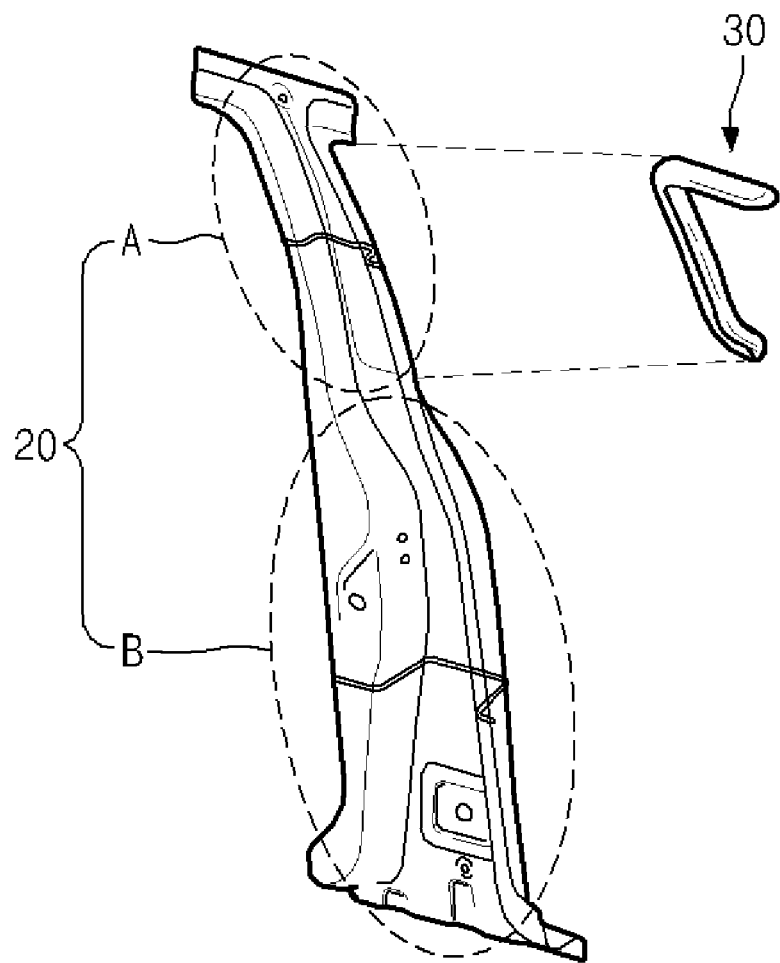
FIG. 5 is a perspective view for illustrating a state that an outer reinforcement member for a center pillar and a gusset of FIG. 4 are separated from each other.
Figure 6:
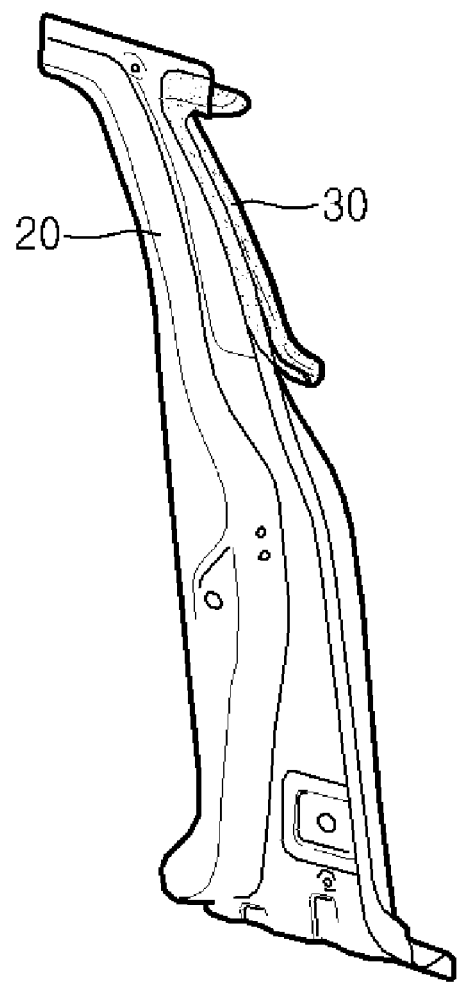
FIG. 6 is a perspective view for illustrating a state that an outer reinforcement member for a center pillar and a gusset of FIG. 5 are connected to each other.

As shown in FIGS. 3 to 6, a center pillar assembly of a 3-door vehicle according to an exemplary embodiment of the present invention includes a side outer panel 10 in which a quarter glass flange 15 is formed, an outer reinforcement member 20 for a center pillar for reinforcing the side outer panel 10, in which its upper portion A and its lower portion B are formed in a cross section of '⊐⊏'-shape, a gusset 30 for connecting the upper portion A of the outer reinforcement member 20 with the quarter glass flange 15, and a side inner panel 40 being arranged in an inner part of the side outer panel 10, and being connected with the outer reinforcement member 20 and the gusset 30.

The quarter glass flange 15 is a place where a quarter glass is equipped with and connected to, in which it is formed at the side outer panel 10.

The outer reinforcement member 20 for a center pillar is formed to be long along a length direction, and is welded to the side outer panel 10, in which it includes the upper portion A close to the quarter glass flange 15 and the lower portion B extended along the bottom of the upper portion A.

Both of the upper portion A and the lower portion B of the outer reinforcement member 20 for a center pillar are formed in the section of '⊐⊏'-shape. As described above, while the upper portion A' of the outer reinforcement member 120 for a center pillar according to the prior art is formed in the section of ''-shape, both of the upper portion A and the lower portion B of the outer reinforcement member 20 according to an exemplary embodiment of the present invention are formed in the section of '⊐⊏'-shape by increasing its strength to be remarkably profited from the broad-collision. On the other hand, because the sections of the upper portion A and the lower portion B of the outer reinforcement member 20 for a center pillar according to an exemplary embodiment of the present invention are hardly changed in comparison with the prior art, it is capable of molding the outer reinforcement member 20 for a center pillar by cold press-molding using the ultra-high strength steel over 980 MPa. Accordingly, the light weight may be accomplished and the manufacturing cost may be reduced In addition, because the upper portion A of the outer reinforcement member 20 for a center pillar is formed in the section of '⊐⊏'-shape, there is an advantage that the additional reinforcement member 130 for reinforcing the conventional 'Neck' part N becomes unnecessary.

At this point, it cannot be connected to the quarter glass flange 15 because the upper portion A of the outer reinforcement member 20 for a center pillar is formed in the section of '⊐'-shape, wherein the gusset 30 may combine the upper portion A of the outer reinforcement member 20 for a center pillar into the quarter glass flange 15.

The gusset 30 includes a gusset body 33 formed along a length direction of the quarter glass flange 15, and connected to the side of the outer reinforcement member 20 for a center pillar, and a first gusset flange 31 being bent from one side of the gusset body 33, and being connected to the quarter glass flange 15, a second gusset flange 32 being bent from another side of the gusset body 33, and being connected to the outer reinforcement member 20 and the side inner panel 40.

At this point, the gusset 30 may be formed in a '⊏'-shape, and its length is longer than a length of the quarter glass flange 15 so that the upper portion A of the outer reinforcement member 20 for a center pillar may be fully connected with the quarter glass flange 15. Here, a shape of the gusset 30 may be formed in a '⌐'-shape, in which it is not limited to the above-described shape if the upper portion A of the outer reinforcement member 20 for a center pillar may be fully connected with the quarter glass flange 15.

At this time, if the gusset 30 has a strength enough to connect the outer reinforcement member 20 for a center pillar with the quarter glass flange 15, it is manufactured by a mild-steel which is a relatively low-priced article.

In an exemplary embodiment of the present invention, the gusset 30 is disposed along a length direction of the outer reinforcement member 20 between the upper portion of the outer reinforcement member 20 and the quarter glass flange 15 and formed in a cross section '⊏' shape.

The assembling process for the center pillar assembly of a 3-door vehicle according to an exemplary embodiment of the present invention having the above-described structure will be roughly explained as follows.

First begin with, the gusset body 33 of the gusset 30 is contacted to the side of the outer reinforcement member 20 for a center pillar, and then, the gusset 30 is connected to the outer reinforcement member 20 for a center pillar to be united by welding the contact part.

Then, after the side outer panel 10 is contacted to the outer part of the gusset 30 and the outer reinforcement member 20, the contact part is welded so as to combine the quarter glass flange 15 into the first gusset flange 31 of the gusset 30.

Lastly, after the side inner panel 40 is contacted to the inner part of the gusset 30 and the outer reinforcement member 20 for a center pillar, the side inner panel 40 is welded to combine the side inner panel 40 into the outer reinforcement member 20 and the second gusset flange 32 of the gusset 30, and accordingly the assembling process is finished.

As described above, according to an exemplary embodiment of the present invention, both of the upper portion A and lower portion B of the outer reinforcement member 20 for a center pillar are formed in the section of '⌐⌐'-shape, and thus, it may increase its strength to be profited from the broad-collision, and may reduce the manufacturing cost because an additional reinforcement member needs not to add into the conventional 'neck' part N.

Furthermore, because the sections of the upper portion A and lower portion B of the outer reinforcement member 20 for a center pillar are hardly changed, it is possible to accomplish the light weight of the vehicle owing to using the ultra-high strength steel with much restriction for formability. In addition, because it is possible to perform the cold press-molding, the manufacturing cost may be reduced in comparison with the prior art in which the hot stamping method must be used.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center pillar assembly of a 3-door vehicle, comprising:
    a side outer panel, one end portion of which is formed with a quarter glass flange;
    an outer reinforcement member for a center pillar for reinforcing the side outer panel, in which an upper portion and a lower portion of the outer reinforcement member are formed in a cross section of '⌐⌐'-shape;
    a gusset for connecting the upper portion of the outer reinforcement member with the quarter glass flange, wherein one lateral side portion of the outer reinforcement member is connected to the gusset; and
    a side inner panel being arranged in an inner part of the side outer panel, one lateral side portion thereof being connected to the one lateral side portion of the outer reinforcement member and the gusset.

2. The center pillar assembly of a 3-door vehicle according to claim 1, wherein the gusset comprises:
    a gusset body formed along a length direction of the quarter glass flange, and connected to the one lateral side portion of the outer reinforcement member for the center pillar; and
    a first gusset flange being bent outwards from one side of the gusset body, and being connected to the quarter glass flange.

3. The center pillar assembly of a 3-door vehicle according to claim 2, wherein the gusset body and the first gusset are formed in a cross section '⌐' shape.

4. The center pillar assembly of a 3-door vehicle according to claim 2, wherein the gusset further comprises a second gusset flange being bent outwards from another side of the gusset body, and being connected to the one lateral side portion of the outer reinforcement member and the one lateral side portion of the side inner panel.

5. The center pillar assembly of a 3-door vehicle according to claim 4, wherein the first gusset flange, the gusset body and the second gusset of the gusset are formed in a cross section '⊏' shape.

6. The center pillar assembly of a 3-door vehicle according to claim 1, wherein the gusset is manufactured to be longer than a length of the quarter glass flange.

7. The center pillar assembly of a 3-door vehicle according to claim 1, wherein the outer reinforcement member is molded by cold press-molding using steel over 980 MPa.

8. The center pillar assembly of a 3-door vehicle according to claim 1, wherein the gusset is disposed along a length direction of the outer reinforcement member between the upper portion of the outer reinforcement member and the quarter glass flange and formed in a cross section '⊏' shape.

* * * * *